United States Patent
Dai et al.

(10) Patent No.: US 12,432,281 B2
(45) Date of Patent: Sep. 30, 2025

(54) INFORMATION PROCESSING METHOD, DEVICE AND STORAGE MEDIUM

(71) Applicant: Beijing Zitiao Network Technology Co., Ltd., Beijing (CN)

(72) Inventors: Lan Dai, Beijing (CN); Xinshuang Wang, Beijing (CN); Yujiang Qiu, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 21 days.

(21) Appl. No.: 18/605,346

(22) Filed: Mar. 14, 2024

(65) Prior Publication Data
US 2024/0314211 A1 Sep. 19, 2024

(30) Foreign Application Priority Data
Mar. 14, 2023 (CN) .......................... 202310267400.8

(51) Int. Cl.
*G06F 15/173* (2006.01)
*H04L 67/306* (2022.01)
*H04L 67/52* (2022.01)

(52) U.S. Cl.
CPC ............ *H04L 67/306* (2013.01); *H04L 67/52* (2022.05)

(58) Field of Classification Search
CPC .............................. H04L 67/306; H04L 67/52
USPC ....................................................... 709/224
See application file for complete search history.

(56) References Cited

U.S. PATENT DOCUMENTS

| | | | |
|---|---|---|---|
| 11,593,445 B2* | 2/2023 | Koch | G06F 16/9537 |
| 2014/0244761 A1* | 8/2014 | Dale | H04L 63/102 |
| | | | 709/204 |
| 2018/0373862 A1* | 12/2018 | Feijoo | H04L 63/205 |
| 2022/0278863 A1* | 9/2022 | Huang | H04L 12/1813 |
| 2023/0075137 A1* | 3/2023 | Abhyankar | G06Q 50/01 |
| 2025/0023867 A1* | 1/2025 | Polish | H04L 63/0815 |

FOREIGN PATENT DOCUMENTS

CN 106470110 A 3/2017

* cited by examiner

Primary Examiner — Alan S Chou
(74) Attorney, Agent, or Firm — Astute IP Law Group (57) ABSTRACT

An information processing method, device and computer-readable storage medium are provided. The method includes, displaying a page corresponding to a first service function, the page including a user input region; acquiring, in response to a trigger operation on the user input region, a plurality of user identities input in the user input region, the plurality of user identities including a first user identity, and the first user identity is a user identity corresponding to a second service function; and displaying user information corresponding to at least one user identity of the plurality of user identities and corresponding to the first service function. The at least one user identity includes the first user identity.

19 Claims, 6 Drawing Sheets

S101
displaying a page corresponding to a first service function, the page including a user input region S102
acquiring, in response to a trigger operation on the user input region, a plurality of user identities input in the user input region, the plurality of user identities including a first user identity, and the first user identity being a user identity corresponding to a second service function S103
displaying user information corresponding to at least one user identity of the plurality of user identities and corresponding to the first service function, the at least one user identity including the first user identity

INFORMATION PROCESSING METHOD, DEVICE AND STORAGE MEDIUM

CROSS-REFERENCE TO RELATED APPLICATION

The present disclosure claims priority of the Chinese Patent Application No. 202310267400.8 filed to the State Intellectual Property Office on Mar. 14, 2023, the disclosures of which is incorporated herein by reference in its entirety as part of the present application.

TECHNICAL FIELD

The present disclosure relates to the technical field of computers, in particular to an information processing method, device and storage medium.

BACKGROUND

Users can communicate and cooperate through application programs. For some suite-based application programs, they have multiple service functions; for example, they provide an instant messaging function, an e-mail function, a schedule function and so on. At present, for application programs with multiple functions, the communication and cooperation between users is inefficient.

Therefore, there is an urgent need for a solution that can solve the above technical problem.

SUMMARY

In order to solve or at least partially solve the above technical problem, embodiments of the present disclosure provide an information processing method and device.

An information processing method provided by embodiments of the present disclosure, including: displaying a page corresponding to a first service function, wherein the page includes a user input region; acquiring, in response to a trigger operation on the user input region, a plurality of user identities input in the user input region, wherein the plurality of user identities includes a first user identity, and the first user identity is a user identity corresponding to a second service function; and displaying user information corresponding to at least one user identity of the plurality of user identities and corresponding to the first service function, wherein the at least one user identity includes the first user identity.

Optionally, the user information corresponding to the first user identity and corresponding to the first service function is determined as follows: determining a global user identity corresponding to the first user identity; determining, according to the global user identity, user information corresponding to the global user identity and corresponding to the first service function.

Optionally, the determining a global user identity corresponding to the first user identity includes: determining that the first user identity matches with a target user identity corresponding to the second service function; determining the global user identity corresponding to the target user identity; the determining that the first user identity matches with a target user identity corresponding to the second service function includes: determining, in response to the plurality of user identities being input with a pasting input mode, that the first user identity matches with the target user identity corresponding to the second service function in a case where the first user identity is the same as the target user identity; or determining, in response to the plurality of user identities being input with a non-pasting mode, that the first user identity matches with the target user identity corresponding to the second service function in a case where a similarity between the first user identity and the target user identity is higher than a preset threshold.

Optionally, the plurality of user identities include at least two second user identities, and each of the at least two second user identities has a plurality of user information corresponding to the first service function; the displaying user information corresponding to at least one user identity of the plurality of user identities and corresponding to the first service function includes: displaying the plurality of user information corresponding to each second user identity of the at least two second user identities and corresponding to the first service function, respectively.

Optionally, the plurality of user identities include a third user identity, and the third user identity has a plurality of user information corresponding to the first service function; the displaying user information corresponding to at least one user identity of the plurality of user identities and corresponding to the first service function includes: displaying the plurality of user information corresponding to the third user identity and corresponding to the first service function; the plurality of user information corresponding to the third user identity and corresponding to the first service function include a first user information and at least one second user information, the first user information is in a selected state, and the at least one second user information is in a non-selected state.

Optionally, the plurality of user identities include a fourth user identity, the fourth user identity is a user identity corresponding to a preset service function, and the method further includes: displaying, in a case where there is no user information corresponding to the fourth user identity and corresponding to the first service function, user information corresponding to a fifth user identity, wherein the fifth user identity is a user identity corresponding to the preset service function, and the fifth user identity is obtained by computing on the fourth user identity using a preset algorithm.

Optionally, the first service function is different from the second service function, and both the first service function and the second service function include any one of the following: an instant messaging function; a schedule function; an e-mail function; a multimedia conference function; an online document function.

Optionally, the method further includes: performing, in response to a confirmation operation triggered for the user information corresponding to the at least one user identity and corresponding to the first service function, an operation corresponding to the first service function based on the user information corresponding to the at least one user identity and corresponding to the first service function.

Optionally, the performing an operation corresponding to the first service function includes: creating a group, adding a schedule participant, sending an e-mail, sending a multimedia conference invitation, or authorizing an online document processing permission.

Embodiments of the disclosure provides an information processing apparatus, including: a first display unit, configured to display a page corresponding to a first service function, wherein the page includes a user input region; an acquiring unit, configured to acquire, in response to a trigger operation on the user input region, a plurality of user identities input in the user input region, wherein the plurality of user identities includes a first user identity, and the first user identity is a user identity corresponding to a second service function; a second display unit, configured to display user information corresponding to at least one user identity of the plurality of user identities and corresponding to the first service function, wherein the at least one user identity includes the first user identity.

Optionally, user information corresponding to the first user identity and corresponding to the first service function is determined as follows: determining a global user identity corresponding to the first user identity; determining, according to the global user identity, user information corresponding to the global user identity and corresponding to the first service function.

Optionally, the determining a global user identity corresponding to the first user identity includes: determining that the first user identity matches with a target user identity corresponding to the second service function; determining a global user identity corresponding to the target user identity; the determining that the first user identity matches with a target user identity corresponding to the second service function includes: determining, in response to the plurality of user identities being input with a pasting input mode, that the first user identity matches with the target user identity corresponding to the second service function in a case where the first user identity is the same as the target user identity; or determining, in response to the plurality of user identities being input with a non-pasting mode, that the first user identity matches with the target user identity corresponding to the second service function in a case where a similarity between the first user identity and the target user identity is higher than a preset threshold.

Optionally, the plurality of user identities include at least two second user identities, and each of the at least two second user identities has a plurality of user information corresponding to the first service function; the second display unit is configured to: display the plurality of user information corresponding to each second user identity of the at least two second user identities and corresponding to the first service function, respectively Optionally, the plurality of user identities include a third user identity, and the third user identity has a plurality of user information corresponding to the first service function; the second display unit is configured to: display the plurality of user information corresponding to the third user identity and corresponding to the first service function; the plurality of user information corresponding to the third user identity and corresponding to the first service function include a first user information and at least one second user information, the first user information is in a selected state, and the at least one second user information is in a non-selected state.

Optionally, the plurality of user identities include a fourth user identity, the fourth user identity is a user identity corresponding to a preset service function, and the apparatus further includes: a third display unit, configured to display, in a case where there is no user information corresponding to the fourth user identity and corresponding to the first service function, user information corresponding to a fifth user identity, wherein the fifth user identity is a user identity corresponding to the preset service function, and the fifth user identity is obtained by computing on the fourth user identity using a preset algorithm.

Optionally, the first service function is different from the second service function, and both the first service function and the second service function include any one of the following: an instant messaging function; a schedule function; an e-mail function; a multimedia conference function; an online document function.

Optionally, the apparatus further includes: an execution unit, configured to perform, in response to a confirmation operation triggered for the user information corresponding to the at least one user identity and corresponding to the first service function, an operation corresponding to the first service function based on the user information corresponding to the at least one user identity and corresponding to the first service function Optionally, the performing an operation corresponding to the first service function includes: creating a group, adding a schedule participant, sending an e-mail, sending a multimedia conference invitation, or authorizing an online document processing permission.

Embodiments of the disclosure provide a device, including a processor and a memory; the processor is configured to execute instructions stored in the memory, so as to cause the device to perform any method of the above.

Embodiments of the disclosure provide a computer-readable storage medium, including instructions that instruct a device to perform any method of the above.

Embodiments of the disclosure provide a computer program product. When running on a computer, the computer program product causes the computer to execute any method of the above.

BRIEF DESCRIPTION OF DRAWINGS

To describe the technical solutions in the embodiments of the present disclosure or in the prior art more clearly, the accompanying drawings required in the description of the embodiments or the prior art will be described briefly below. Apparently, the accompanying drawings described below are only some embodiments recorded in the disclosure, and other accompanying drawings can also be derived from these drawings by those ordinarily skilled in the art without creative efforts.

DETAILED DESCRIPTION

In order to make those skilled in the art to better understand the solution of the disclosure, the technical solution of the embodiments of the disclosure will be clearly and completely described below in combination with the accompanying drawings of the embodiments of the disclosure. Obviously, the described embodiment is only a part of the embodiments of the disclosure, but not all of the embodiments of the disclosure. Based on the embodiments of the disclosure, all other embodiments obtained by those skilled in the field without creative efforts are within the scope of protection in the disclosure.

The inventor(s) of the present disclosure have found through research that some application programs have multiple service functions. At present, for an application program that integrates multiple functions, the communication and cooperation between users is inefficient. For example, the application program has a service function 1 and a service function 2. When user A uses service function 1, he/she wants to cooperate and communicate with user B. However, user A only knows the user identity of user B corresponding to the service function 2, but does not know the user identity of user B corresponding to the service function 1. In this case, if user A wants to cooperate and communicate with user B when using the service function 1, he/she needs to acquire the user identity of user B corresponding to the service function 1 in advance, so as to cooperate and communicate with user B based on the user identity of user B corresponding to the service function 1. Therefore, the cooperation and communication between users is inefficient.

In order to solve the above problem, the embodiments of the present disclosure provide an information processing method and apparatus.

Various non-limiting embodiments of the present disclosure will be described in detail with reference to the accompanying drawings.

Exemplary Method

Figure 1:
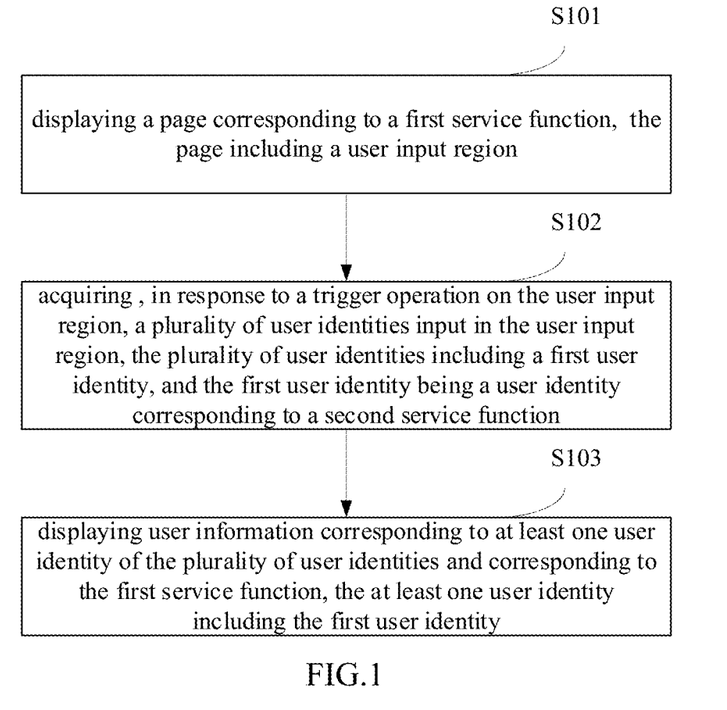
FIG. 1 is a flowchart of an information processing method provided by an embodiment of the present disclosure.

Referring to FIG. 1, FIG. 1 is a flowchart of an information processing method provided by an embodiment of the present disclosure. In one example, the method provided by the embodiment of the present disclosure can be applied to a client, which can be a client with multiple service functions. In the present embodiment, the method can include, for example, the following steps S101-S103.

S101: displaying a page corresponding to a first service function, wherein the page includes a user input region.

In the embodiment of the present disclosure, the first service function can be one of a plurality of service functions supported by the application program. As an example, the first service function can be one of an instant messaging function, a schedule function, an e-mail function, a multimedia conference function or an online document function.

When the user uses the first service function provided by the application program, the client can display the page corresponding to the first service function based on the operation related to the first service function triggered by the user. The embodiment of the present disclosure does not specifically limit the operation related to the first service function and the page corresponding to the first service function, and the operation and the page can be determined according to the actual situation, without being enumerated here.

In the embodiment of the present disclosure, the page corresponding to the first function can include a user input region, and the user input region is used for inputting a user identity. The user can input a user identity in the user input region to search user information corresponding to the user identity input by the user and corresponding to the first service function.

Considering that the user has the demand of searching user information corresponding to a plurality of users and corresponding to the first service function, in order to meet the user demand, the user input region supports the input of a plurality of user identities. In addition, for the client with multiple service functions, considering that the user wants to cooperate and communicate with other users when using the first service function, the user does not know the user identities of other users corresponding to the first service function, but the user may know the user identities of other users corresponding to the second service function; in order to enable the user to cooperate and communicate with other users when using the first service function, without knowing the user identities of other users corresponding to the first service function, but knowing the user identities of other users corresponding to the second service function, the user input region also supports the input of user identities corresponding to the second service function.

Similar to the first service function, the second service function can also be one of the plurality of service functions supported by the application program, and the second service function is different from the first service function. As an example, the second service function can be one of an instant messaging function, schedule function, an e-mail function, a multimedia a conference function or an online document function.

S102: acquiring, in response to a trigger operation on the user input region, a plurality of user identities input in the user input region, wherein the plurality of user identities includes a first user identity, and the first user identity is a user identity corresponding to a second service function.

After the user inputs a plurality of user identities in the user input region, the client can acquire the plurality of user identities input in the user input region in response to a trigger operation on the user input region. The embodiment of the present disclosure does not specifically limit the plurality of user identities, and the plurality of user identities can include the first user identity corresponding to the second service function. For example, the first service function is the instant messaging function, the second service function is the e-mail function, and then the first user identity can be, for example, a mailbox address. The trigger operation on the user input region mentioned herein can be an operation of inputting the plurality of user identities in the user input region.

The embodiment of the present disclosure does not specifically limit the manner in which the user inputs the plurality of user identities in the user input region, and the user can input the plurality of user identities in the user input region in a pasting mode, and can also input the plurality of user identities in the user input region in a non-pasting mode.

S103: displaying user information corresponding to at least one user identity of the plurality of user identities and corresponding to the first service function, wherein the at least one user identity includes the first user identity.

In an example, after the client acquires the plurality of user identities, it can further acquire user information matched with the plurality of user identities and corresponding to the first service function, and if user information corresponding to at least one user identity and corresponding to the first service function is acquired, the user information corresponding to the at least one user identity and corresponding to the first service function is displayed. As an example, the client can display the user information corresponding to the at least one user identity and corresponding to the first service function in the page. As another example, the client can display the user information corresponding to the at least one user identity and corresponding to the first service function in a pop-up manner. The user information mentioned in the embodiment of the present disclosure includes, but is not limited to, one or more of the information such as user name and user avatar.

In the embodiment of the present disclosure, the user information corresponding to the at least one user identity and corresponding to the first service function can include user information corresponding to the first user identity and corresponding to the first service function. As shown, by adopting the solution, the user can input the first user identity corresponding to the second service function in the page corresponding to the first service function, and the client can display the user information corresponding to the first user identity and corresponding to the first service function, so as to facilitate cooperation and communication with a user corresponding to the first user identity.

In an example, after the client displays the user information corresponding to the at least one user identity and corresponding to the first service function, a confirmation operation can be triggered for the user information corresponding to the at least one user identity and corresponding to the first service function. For example, the user can trigger the confirmation operation through a confirmation control. Accordingly, the client can perform, in response to the confirmation operation triggered for the user information corresponding to the at least one user identity and corresponding to the first service function, an operation corresponding to the first service function based on the user information corresponding to the at least one user identity and corresponding to the first service function. By adopting the solution, if the user wants to cooperate and communicate with a plurality of users when using the first service function, he/she can input a plurality of user identities in the user input region, and further trigger a confirmation operation for the user information corresponding to the at least one user identity and corresponding to the first service function, so that the rapid cooperation and communication with the plurality of users can be realized, and the efficiency of cooperation and communication is improved.

Regarding the performing the operation corresponding to the first service function, it should be noted that it can be one of creating a group, adding a schedule participant, sending an e-mail, sending a multimedia conference invitation, or authorizing an online document processing permission, and personnel selection operations are required in these scenarios. As a specific example, if the first service function is the instant messaging function, performing the operation corresponding to the first service function can be, for example, creating a group, and at this time, group members need to be selected; if the first service function is the schedule function, performing the operation corresponding to the first service function can be, for example, adding a schedule participant; if the first service function is the e-mail function, performing the operation corresponding to the first service function can be, for example, sending an e-mail, and at this time, the e-mail receiver needs to be selected; if the first service function is the multimedia conference function, performing the operation corresponding to the first service function can be, for example, sending a multimedia conference invitation, and at this time, the invitee needs to be selected; if the first service function is the online document function, performing the operation corresponding to the first service function can be, for example, authorizing an online document processing permission, and at this time, a user targeted for permission processing need to be selected. The online document processing permission mentioned herein can be one or more of reading permission, editing permission and sharing permission.

Figure 2A:
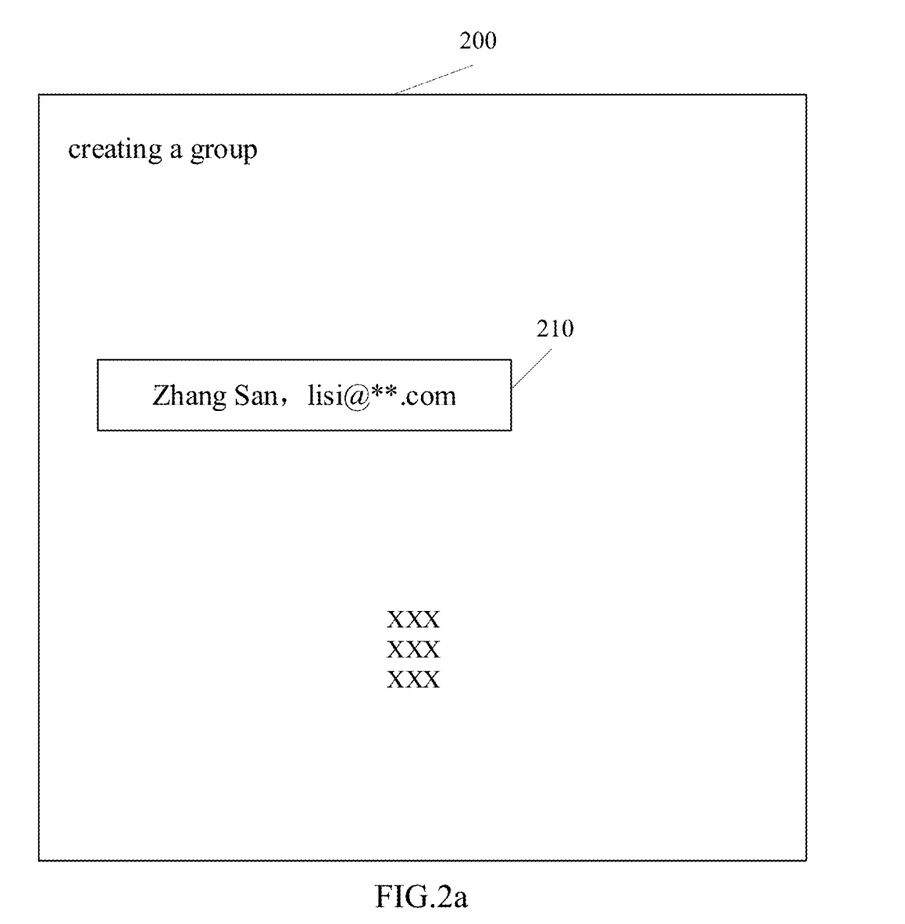
FIG. 2a is a schematic diagram of a page corresponding to a first service function provided by an embodiment of the present disclosure.
Figure 2B:
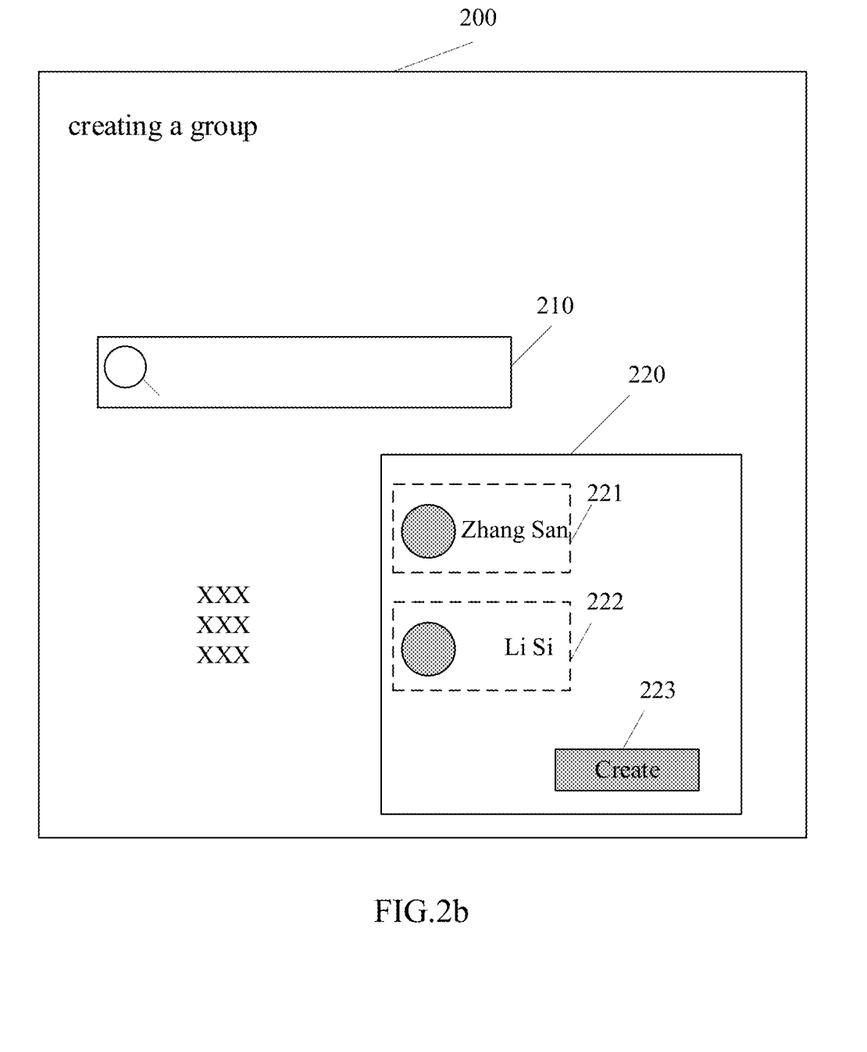
FIG. 2b is a schematic diagram of a page corresponding to a first service function provided by an embodiment of the present disclosure.

It is taken as an example for illustration that the first service function is the instant messaging function and the second service function is the e-mail function. It can be understood with reference to FIG. 2a and FIG. 2b, each of which is a schematic diagram of a page corresponding to a first service function provided by an embodiment of the present disclosure. As shown in FIG. 2a, the page 200 corresponding to the first service function includes a user input region 210, in which the user inputs "Zhang San" and list@.com. Accordingly, the page displayed by the client is updated as shown in FIG. 2b, and user information 221 and user information 222 are displayed in the region 220 of the page; the user information 221 is user information corresponding to Zhang San, and the user information 222 is user information corresponding to Li Si. The circle in the user information represents the user avatar. A confirmation control 223 is further included in the region 220, and the confirmation control 223 is used to trigger the operation of creating a group. After the user triggers an operation on the control 223, the client can create a group including the users "Zhang San" and "Li Si". That is, in the embodiment, "Li Si" is the user information corresponding to "lisi@.com" and corresponding to the first service function, the instant messaging function. That is, the user has the user identity "list@**.com" in the e-mail function, and the user information of the user in the instant messaging function is "Li Si."

In one example, the client can determine the user information corresponding to the at least one user identity and corresponding to the first service function according to the plurality of user identities. In another example, the server can also determine the user information corresponding to the at least one user identity and corresponding to the first service function according to the plurality of user identities, and then send the determined user information to the client.

For any one user identity of the at least one user identity, the method of determining the user information corresponding to the user identity and corresponding to the first service function is similar. Hereinafter, taking the first user identity as an example, the method of determining the user information corresponding to the first user identity and corresponding to the first service function will be described.

In one example, for each user, a correspondence relationship between the user and user information corresponding to each service function can be constructed. After acquiring the first user identity, the aforementioned correspondence relationship can be retrieved by using the first user identity as an index, so as to acquire the user information corresponding to the first user identity and corresponding to the second service function; and further, user information corresponding to the first user identity and corresponding to the first service function can be acquired based on the correspondence relationship. For example, the correspondence relationship includes a correspondence relationship between user information 1 and user information 2, the user information 1 is user information corresponding to the first service function, and the user information 2 is user information corresponding to the second service function; after retrieving the user information 2 by using the first user identity as the index, the user information 1 can be obtained according to the correspondence relationship, so that the user information corresponding to the first user identity and corresponding to the first service function can be obtained.

In another example, for each user, a global user identity can be established for the user, and the global user identity has a correspondence relationship with the user identity of the user corresponding to each service function. In this case, the user information corresponding to the first user identity and corresponding to the first service function can be determined by the following steps A1-A2.

Step A1: determining a global user identity corresponding to the first user identity.

In the embodiment of the present disclosure, the global user identity corresponding to the first user identity can be found by taking the first user identity as an index. As an example, a plurality of user identities corresponding to the second service function can be searched by taking the first user identity as an index. If the first user identity matches with a target user identity corresponding to the second service function, a global user identity corresponding to the target user identity is further determined based on the target user identity, and the global user identity corresponding to the target user identity is the global user identity corresponding to the first user identity. In a specific example, the global user identity can be determined according to the target user identity and the correspondence relationship between the target user identity and the global user identity.

As mentioned above, the user inputs a plurality of user identities in the user input region, which can be input by pasting or non-pasting. In an example, considering that if the input mode of the plurality of user identities is pasting input, the plurality of user identities can be considered to be relatively accurate, and the user wants to acquire accurate user information corresponding to the user identities and corresponding to the first service function; therefore, in this case, when the target user identity is the same as the first user identity, it can be determined that the first user identity matches with the target user identity. In another example, if the input mode of the plurality of user identities is non-pasting input, there may be input errors in the plurality of user identities; in this case, in order to provide users with the desired user information as much as possible, if the similarity between the first user identity and the target user identity is higher than a preset threshold, it can be determined that the first user identity matches with the target user identity. The embodiment of the present disclosure does not specifically limit the preset threshold, and the preset threshold can be, for example, a value between 0 and 1; for example, the preset threshold can be 0.85.

Step A2: determining, according to the global user identity, user information corresponding to the global user identity and corresponding to the first service function.

After determining the global user identity, the user information corresponding to the global user identity and corresponding to the first service function can be further obtained based on the correspondence relationship between the global user identity and the user information corresponding to the first service function. The user information corresponding to the global user identity and corresponding to the first service function is the user information corresponding to the first user identity and corresponding to the first service function.

In an example, for the plurality of user identities, some of the user identities may have a plurality of user information corresponding to the first service function. For example, for a user identity "Xiao Ming", there are a plurality of users with the user identity "Xiao Ming" corresponding to the first service function.

In the embodiment of the present disclosure, if the plurality of user identities include at least two second user identities and each second user identity has a plurality of user information corresponding to the first service function, in a specific implementation of S103, the plurality of user information corresponding to each second user identity of the at least two second user identities and corresponding to the first service function can be respectively displayed. As an example, the plurality of user information corresponding to each second user identity of the at least two second user identities and corresponding to the first service function can be respectively displayed in a first region of the page. In addition, the at least two second user identities can also be displayed in the user input region. In this way, for each second user identity of the at least two second user identities, the client can display the plurality of user information corresponding to the second user identity and corresponding to the first service identity for the user to select.

Figure 2C:
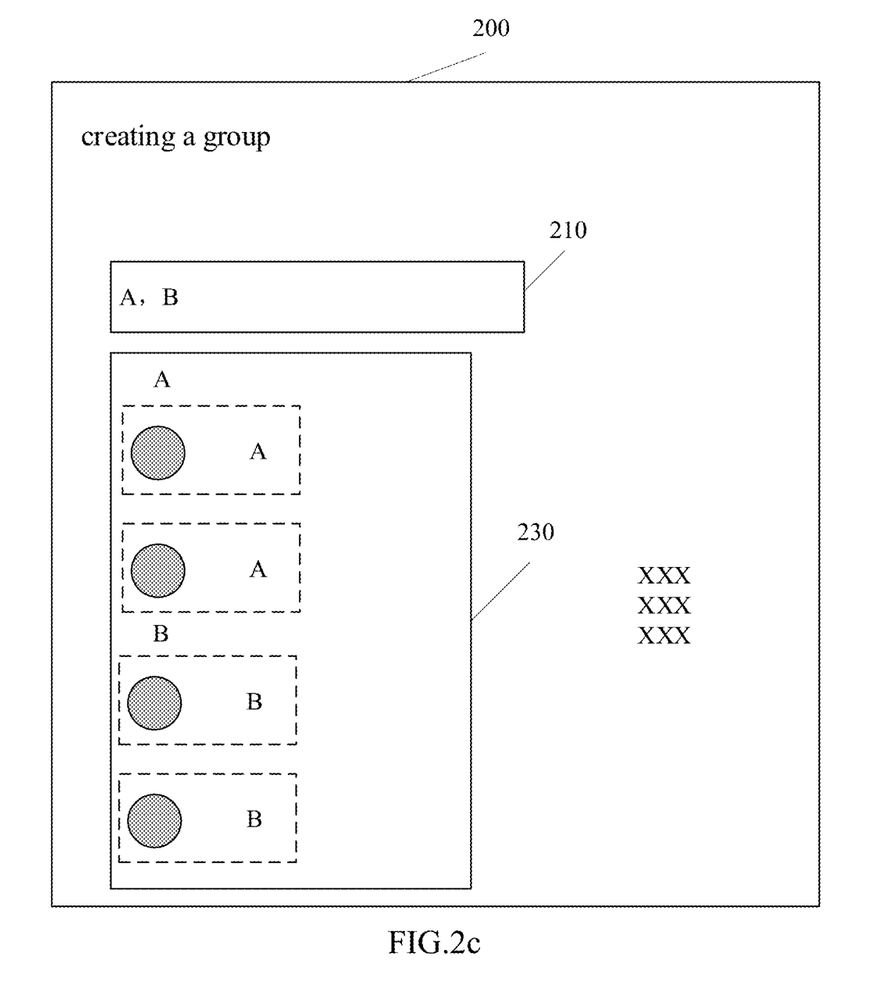
FIG. 2c is a schematic diagram of a page corresponding to a first service function provided by an embodiment of the present disclosure.

It can be understood with reference to FIG. 2c, which is a schematic diagram of a page corresponding to a first service function provided by an embodiment of the disclosure. For the plurality of user identities, both the user identity "A" and the user identity "B" have a plurality of user information corresponding to the first service function, and then, the plurality of user information corresponding to the user identity "A" and the plurality of user information corresponding to the user identity "B" can be respectively displayed in the region 230 of the page 200.

In one example, the plurality of user identities include a third user identity, and the third user identity has a plurality of user information corresponding to the first service function. In this case, in a specific implementation of S103, the plurality of user information corresponding to the third user identity and corresponding to the first service function can be displayed, so that the user can conveniently select from the plurality of user information corresponding to the third user identity and corresponding to the first service function. The plurality of user information corresponding to the third user identity and corresponding to the first service function can include first user information and at least one second user information. When displaying the first user information and the at least one second user information, the first user information is in a selected state, and the at least one second user information is in a non-selected state.

In an example, the plurality of user information corresponding to the third user identity and corresponding to the first service function can be displayed in a first region of the page, and the first user information in a selected state in the first region can also be displayed in a second region of the page. In this way, when the third user identity has a plurality of user information corresponding to the first service function, one first user information can be automatically selected for the user, and other second user information is in a non-selected state for the user's reference or selection.

Figure 2D:
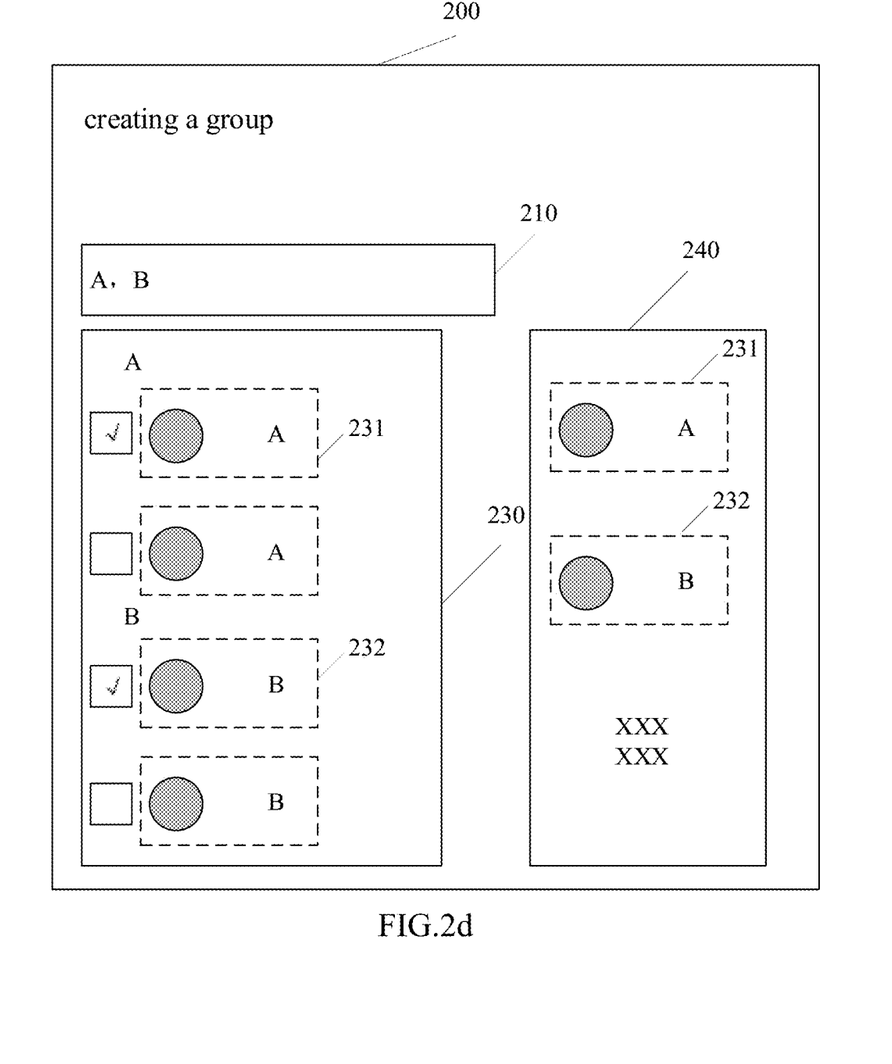
FIG. 2d is a schematic diagram of a page corresponding to a first service function provided by an embodiment of the present disclosure.

It can be understood with reference to FIG. 2d, which is a schematic diagram of a page corresponding to a first service function provided by an embodiment of the present disclosure. The plurality of user information corresponding to the user identity "A" and the plurality of user information corresponding to the user identity "B" are respectively displayed in the region 230 of the page 200; and among the plurality of user information corresponding to the user identity "A", one user information 231 is in a selected state and other user information is in a non-selected state; and among the plurality of user information corresponding to the user identity "B", one user information 232 is in a selected state and other user information is in a non-selected state. In addition, the user information corresponding to the at least one user identity and corresponding to the first service function are respectively displayed in the region 240 of the page; and for the user identity "A", the user information displayed in the region 240 is the user information 231 in a selected state in the region 230; for the user identity "B", the user information displayed in the region 240 is the user information 232 in a selected state in the region 230.

It should be noted that FIGS. 2a-2d are merely illustrated for the convenience of understanding the solution and do not constitute a limitation on the embodiment of the disclosure. Other contents can also be displayed on the page 200, which are indicated by "XXX" in FIGS. 2*a*-2*d*.

In an example, the plurality of user identities include a fourth user identity, the fourth user identity can be a user identity corresponding to a preset service function, and the preset service function can be, for example, the e-mail function; and accordingly, the fourth user identity can be a mailbox address. In a specific example, if user information corresponding to the fourth user identity and corresponding to the first service function is not determined based on the fourth user identity, in other words, there is no user information corresponding to the fourth user identity and corresponding to the first service function. In this case, user information corresponding to a fifth user identity can be displayed. The fifth user identity can be a user identity corresponding to the preset service function, and the fifth user identity can be obtained, for example, by computing on the fourth user identity using a preset algorithm. The embodiment of the present disclosure does not specifically limit the preset algorithm, and the preset algorithm can be, for example, a regular matching algorithm. In this case, even if there is no user information corresponding to the fourth user identity and corresponding to the first service function, the user information corresponding to the fifth user identity can still be recommended for the user, so that the user can perform a corresponding operation based on the information corresponding to the fifth user identity, thereby improving the user experience.

The embodiments of the present disclosure provide an information processing method, which can be, for example, applied to a client. The client can display a page corresponding to a first service function, and the page includes a user input region. A user can input a plurality of user identities in the user input region, and the plurality of user identities can include a first user identity corresponding to a second service function. Accordingly, the client can acquire the plurality of user identities input in the user input region in response to a trigger operation on the user input region, and further display user information corresponding to at least one user identity of the plurality of user identities and corresponding to the first service function, and the at least one user identity includes the first user identity. As shown, by adopting the solution, the user can input the first user identity corresponding to the second service function in the page corresponding to the first service function, and the client can also display the user information corresponding to the first user identity and corresponding to the first service function, so as to facilitate cooperation and communication with a user corresponding to the first user identity. In other words, when using the first service function, user A can find the user information corresponding to user B and corresponding to the first service function through the user identity of user B corresponding to the second service function, even though he/she does not know the user identity of user B corresponding to the first service function. Therefore, by adopting the solution of the embodiment of the present disclosure, the efficiency of collaboration and communication between users can be effectively improved.

Exemplary Device

Based on the method provided in the above embodiments, an embodiment of the present disclosure further provides an apparatus, which will be described with reference to the accompanying drawings.

Figure 3:
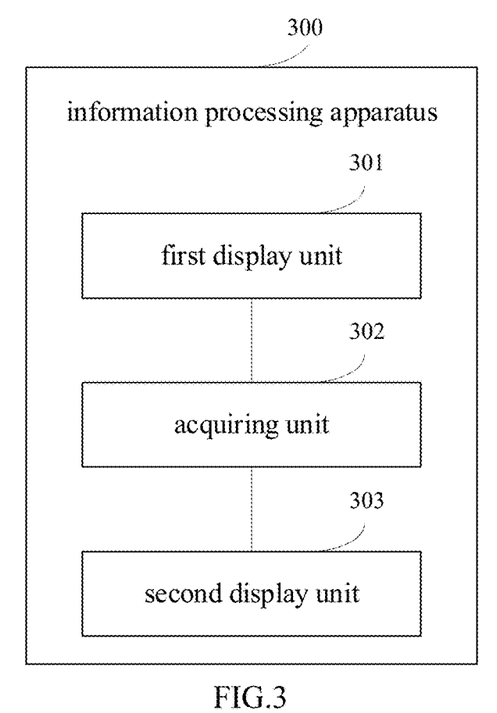
FIG. 3 is a schematic structural diagram of an information processing apparatus provided by an embodiment of the present disclosure.

Referring to FIG. 3, FIG. 3 is a schematic structural diagram of an information processing apparatus provided by an embodiment of the present disclosure. The information processing apparatus 300 shown in FIG. 3 includes a first display unit 301, an acquiring unit 302 and a second display unit 303.

The first display unit 301 is configured to display a page corresponding to a first service function, and the page includes a user input region.

The acquiring unit 302 is configured to acquire, in response to a trigger operation on the user input region, a plurality of user identities input in the user input region, wherein the plurality of user identities includes a first user identity, and the first user identity is a user identity corresponding to a second service function.

The second display unit 303 is configured to display user information corresponding to at least one user identity of the plurality of user identities and corresponding to the first service function, wherein the at least one user identity includes the first user identity.

Optionally, user information corresponding to the first user identity and corresponding to the first service function is determined as follows:

determining a global user identity corresponding to the first user identity;

determining, according to the global user identity, user information corresponding to the global user identity and corresponding to the first service function.

Optionally, the determining a global user identity corresponding to the first user identity includes:

determining that the first user identity matches with a target user identity corresponding to the second service function;

determining a global user identity corresponding to the target user identity;

the determining that the first user identity matches with a target user identity corresponding to the second service function includes:

determining, in response to the plurality of user identities being input with a pasting input mode, that the first user identity matches with the target user identity corresponding to the second service function in a case where the first user identity is the same as the target user identity; or, determining, in response to the plurality of user identities being input with a non-pasting mode, that the first user identity matches with the target user identity corresponding to the second service function in a case where a similarity between the first user identity and the target user identity is higher than a preset threshold.

Optionally, the plurality of user identities include at least two second user identities, and each of the at least two second user identities has a plurality of user information corresponding to the first service function;

the second display unit 303 is configured to display the plurality of user information corresponding to each second user identity of the at least two second user identities and corresponding to the first service function, respectively.

Optionally, the plurality of user identities include a third user identity, and the third user identity has a plurality of user information corresponding to the first service function;

the second display unit 303 is configured to display the plurality of user information corresponding to the third user identity and corresponding to the first service function, wherein the plurality of user information corresponding to the third user identity and corresponding to the first service function include a first user information and at least one second user information, the first user information is in a selected state, and the at least one second user information is in a non-selected state.

Optionally, the plurality of user identities include a fourth user identity, the fourth user identity is a user identity corresponding to a preset service function, and the apparatus further includes:

a third display unit, configured to display, in a case where there is no user information corresponding to the fourth user identity and corresponding to the first service function, user information corresponding to a fifth user identity, wherein the fifth user identity is a user identity corresponding to the preset service function, and the fifth user identity is obtained by computing on the fourth user identity using a preset algorithm.

Optionally, the first service function is different from the second service function, and both the first service function and the second service function include any one of the following: an instant messaging function;
a schedule function;
an e-mail function;
a multimedia conference function;
an online document function.
Optionally, the apparatus further includes:
an execution unit, configured to perform, in response to a confirmation operation triggered for the user information corresponding to the at least one user identity and corresponding to the first service function, an operation corresponding to the first service function based on the user information corresponding to the at least one user identity and corresponding to the first service function.

Optionally, the performing an operation corresponding to the first service function includes:
creating a group, adding a schedule participant, sending an e-mail, sending a multimedia conference invitation, or authorizing an online document processing permission.

As the apparatus 300 is an apparatus corresponding to the method provided in the above method embodiments, the specific implementation of each unit of the apparatus 300 is of the same concept as the above method embodiments. Therefore, the specific implementation of each unit of the device 300 can refer to related description of the above method embodiments, and details will not be repeated here.

An embodiment of the application further provides a device, which includes a processor and a memory.

The processor is configured to execute instructions stored in the memory, so as to cause the device to perform the information processing method described in any one of the above method embodiments.

Figure 4:
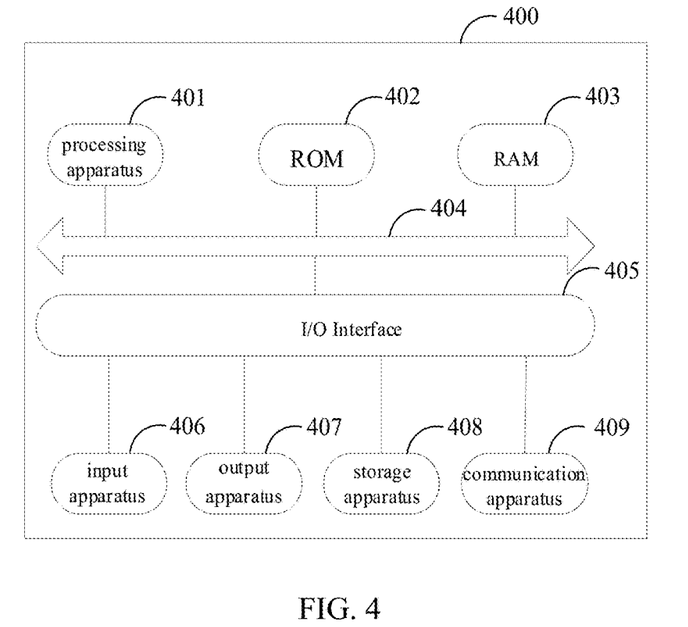
FIG. 4 is a schematic structural diagram of an electronic device provided by an embodiment of the present disclosure.

Referring to FIG. 4, FIG. 4 illustrates a schematic structural diagram of an electronic device 400 suitable for implementing some embodiments of the present disclosure. The electronic devices in embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), or the like, and fixed terminals such as a digital television (TV), a desktop computer, or the like. The electronic device illustrated in FIG. 4 is merely an example, and should not pose any limitation to the functions and the range of use of the embodiments of the present disclosure.

As illustrated in FIG. 4, the electronic device 400 can include a processing apparatus 401 (e.g., a central processing unit, a graphics processor, etc.), which may perform various appropriate actions and processes according to a program stored in a read-only memory (ROM) 402 or a program loaded from a storage apparatus 408 into a random access memory (RAM) 403. Various programs and data required for the operation of the electronic device 1200 may also be stored on the RAM 403. The processing apparatus 401, the ROM 402, and the RAM 403 are connected to each other through a bus 404. An input/output (I/O) interface 405 is also connected to the bus 404.

Generally, the following apparatus may be connected to the I/O interface 405: an input apparatus 406 including, for example, a touch screen, a touch pad, a keyboard, a mouse, a camera, a microphone, an accelerometer, a gyroscope, etc.; an output apparatus 407 including, for example, a liquid crystal display (LCD), a speaker, a vibrator, etc.; a storage apparatus 408 including, for example, a magnetic tape, a hard disk, etc.; and a communication apparatus 409. The communication apparatus 409 may allow the electronic device 400 to perform wireless or wired communication with other devices for data exchange. Although FIG. 4 illustrates the electronic device 1200 having various means, it should be understood that it is not necessary to implement or provide all the illustrated devices. Alternatively, more or fewer devices may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a computer-readable medium. The computer program includes program codes for executing the method illustrated in any of the flowcharts. In these embodiments, the computer program may be downloaded and installed from a network through the communication device 409, or installed from the storage apparatus 408, or installed from the ROM 402. When the computer program is executed by the processing apparatus 401, the above-mentioned functions defined in the method according to the embodiments of the present disclosure are performed.

The electronic device provided by the embodiment of the present disclosure belongs to the same inventive concept as the method provided by the above embodiments, and the technical details not described in detail in the present embodiment can be found in the above embodiments, and the present has the same beneficial effects as the above embodiments.

The embodiments of the present application provide a computer-readable medium on which a computer program is stored. The method described in any of the above embodiments is implemented when the program is executed by a processor.

It should be noted that the above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More specific examples of the computer-readable storage medium may include but not be limited to: an electric connector with one or more wires, a portable computer magnetic disk, a hard disk drive, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

In some implementation modes, a client and a server may be communicated by using any currently known or future-developed network protocols such as a Hypertext Transfer Protocol (HTTP), and may interconnect with any form or medium of digital data communication (such as a communication network). Examples of the communication network include a local area network ("LAN"), a wide area network ("WAN"), an internet work (such as the Internet), and an end-to-end network (such as an ad hoc end-to-end network), as well as any currently known or future-developed networks.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to execute the above-mentioned methods.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The units involved in the embodiments of the present disclosure may be implemented in software or implemented in hardware. Among them, the name of the module/unit does not constitute a limitation of the unit itself under certain circumstances. For example, a voice data acquisition module can also be described as "data acquisition module."

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing. An embodiment of the present disclosure further provides a computer program product which, when running on a computer, causes the computer to execute any of the information processing methods of the above method embodiments.

Those skilled in the art, when considering the specification and practicing the present disclosure, will readily think of other embodiments of the present disclosure. The present disclosure is intended to cover any variation, use or adaptation of the disclosure that follows the general principles of the disclosure and includes common knowledge or customary technical means in the field of technology that are not disclosed herein. The specifications and embodiments are to be considered exemplary only, and the scope and spirit of the disclosure are indicated by the claims below.

It should be understood that the disclosure is not limited to the precise structure already described above and shown in the drawings, and that various modifications and changes may be made without deviating from the scope. The scope of the disclosure is limited only by the claims.

The above is only a better embodiment of the disclosure and is not intended to limit the disclosure. Any modification, equivalent replacement, improvement, etc. made within the spirit and principles of the disclosure shall be covered by the disclosure.

The invention claimed is:

1. An information processing method, comprising:
   displaying a page corresponding to a first service function, wherein the page comprises a user input region;
   acquiring, in response to a trigger operation on the user input region, a plurality of user identities input in the user input region, wherein the plurality of user identities comprises a first user identity, and the first user identity is a user identity corresponding to a second service function; and
   displaying user information corresponding to at least one user identity of the plurality of user identities and corresponding to the first service function, wherein the at least one user identity comprises the first user identity.

2. The method according to claim 1, wherein the user information corresponding to the first user identity and corresponding to the first service function is determined as follows:
   determining a global user identity corresponding to the first user identity;
   determining, according to the global user identity, user information corresponding to the global user identity and corresponding to the first service function.

3. The method according to claim 2, wherein the determining a global user identity corresponding to the first user identity comprises:
   determining that the first user identity matches with a target user identity corresponding to the second service function;
   determining the global user identity corresponding to the target user identity;
   wherein the determining that the first user identity matches with a target user identity corresponding to the second service function comprises:
   determining, in response to the plurality of user identities being input with a pasting input mode, that the first user identity matches with the target user identity corresponding to the second service function in a case where the first user identity is the same as the target user identity; or,
   determining, in response to the plurality of user identities being input with a non-pasting mode, that the first user identity matches with the target user identity corresponding to the second service function in a case where a similarity between the first user identity and the target user identity is higher than a preset threshold.

4. The method according to claim 1, wherein
   the plurality of user identities comprise at least two second user identities, and each of the at least two second user identities has a plurality of user information corresponding to the first service function;
   the displaying user information corresponding to at least one user identity of the plurality of user identities and corresponding to the first service function comprises:
   displaying the plurality of user information corresponding to each second user identity of the at least two second user identities and corresponding to the first service function, respectively.

5. The method according to claim 1, wherein the plurality of user identities comprise a third user identity, and the third user identity has a plurality of user information corresponding to the first service function;
   the displaying user information corresponding to at least one user identity of the plurality of user identities and corresponding to the first service function comprises:
   displaying the plurality of user information corresponding to the third user identity and corresponding to the first service function;
   wherein the plurality of user information corresponding to the third user identity and corresponding to the first service function comprise a first user information and at least one second user information, the first user information is in a selected state, and the at least one second user information is in a non-selected state.

6. The method according to claim 1, wherein the plurality of user identities comprise a fourth user identity, the fourth user identity is a user identity corresponding to a preset service function, and the method further comprises:
   displaying, in a case where there is no user information corresponding to the fourth user identity and corresponding to the first service function, user information corresponding to a fifth user identity, wherein the fifth user identity is a user identity corresponding to the preset service function, and the fifth user identity is obtained by computing on the fourth user identity using a preset algorithm.

7. The method according to claim 1, wherein the first service function is different from the second service function, and both the first service function and the second service function comprise any one of the following:
   an instant messaging function;
   a schedule function;
   an e-mail function;
   a multimedia conference function;
   an online document function.

8. The method according to claim 1, wherein the method further comprises:
   performing, in response to a confirmation operation triggered for the user information corresponding to the at least one user identity and corresponding to the first service function, an operation corresponding to the first service function based on the user information corresponding to the at least one user identity and corresponding to the first service function.

9. The method according to claim 8, wherein the performing an operation corresponding to the first service function comprises:
   creating a group, adding a schedule participant, sending an e-mail, sending a multimedia conference invitation, or authorizing an online document processing permission.

10. A device, comprising a processor and a memory, wherein
    the processor is configured to execute instructions stored in the memory, so as to cause the device to perform an information processing method, wherein the information processing method comprises:
    displaying a page corresponding to a first service function, wherein the page comprises a user input region;
    acquiring, in response to a trigger operation on the user input region, a plurality of user identities input in the user input region, wherein the plurality of user identities comprises a first user identity, and the first user identity is a user identity corresponding to a second service function; and
    displaying user information corresponding to at least one user identity of the plurality of user identities and corresponding to the first service function, wherein the at least one user identity comprises the first user identity.

11. The device according to claim 10, wherein the user information corresponding to the first user identity and corresponding to the first service function is determined as follows:
   determining a global user identity corresponding to the first user identity;
   determining, according to the global user identity, user information corresponding to the global user identity and corresponding to the first service function.

12. The device according to claim 11, wherein the determining a global user identity corresponding to the first user identity comprises:
   determining that the first user identity matches with a target user identity corresponding to the second service function;
   determining the global user identity corresponding to the target user identity;
   wherein the determining that the first user identity matches with a target user identity corresponding to the second service function comprises:
   determining, in response to the plurality of user identities being input with a pasting input mode, that the first user identity matches with the target user identity corresponding to the second service function in a case where the first user identity is the same as the target user identity; or,
   determining, in response to the plurality of user identities being input with a non-pasting mode, that the first user identity matches with the target user identity corresponding to the second service function in a case where a similarity between the first user identity and the target user identity is higher than a preset threshold.

13. The device according to claim 10, wherein the plurality of user identities comprise at least two second user identities, and each of the at least two second user identities has a plurality of user information corresponding to the first service function;
   the displaying user information corresponding to at least one user identity of the plurality of user identities and corresponding to the first service function comprises:
   displaying the plurality of user information corresponding to each second user identity of the at least two second user identities and corresponding to the first service function, respectively.

14. The device according to claim 10, wherein the plurality of user identities comprise a third user identity, and the third user identity has a plurality of user information corresponding to the first service function;
   the displaying user information corresponding to at least one user identity of the plurality of user identities and corresponding to the first service function comprises:
   displaying the plurality of user information corresponding to the third user identity and corresponding to the first service function;
   wherein the plurality of user information corresponding to the third user identity and corresponding to the first service function comprise a first user information and at least one second user information, the first user information is in a selected state, and the at least one second user information is in a non-selected state.

15. The device according to claim 10, wherein the plurality of user identities comprise a fourth user identity, the fourth user identity is a user identity corresponding to a preset service function, and the method further comprises:
   displaying, in a case where there is no user information corresponding to the fourth user identity and corresponding to the first service function, user information corresponding to a fifth user identity, wherein the fifth user identity is a user identity corresponding to the preset service function, and the fifth user identity is obtained by computing on the fourth user identity using a preset algorithm.

16. The device according to claim 10, wherein the first service function is different from the second service function, and both the first service function and the second service function comprise any one of the following:
   an instant messaging function;
   a schedule function;
   an e-mail function;
   a multimedia conference function;
   an online document function.

17. The device according to claim 1, wherein the method further comprises:
   performing, in response to a confirmation operation triggered for the user information corresponding to the at least one user identity and corresponding to the first service function, an operation corresponding to the first service function based on the user information corresponding to the at least one user identity and corresponding to the first service function.

18. The device according to claim 17, wherein the performing an operation corresponding to the first service function comprises:
   creating a group, adding a schedule participant, sending an e-mail, sending a multimedia conference invitation, or authorizing an online document processing permission.

19. A computer-readable storage medium, comprising instructions that instruct a device to perform the method according to claim 1.

* * * * *